(12) United States Patent
Singh et al.

(10) Patent No.: US 11,914,593 B2
(45) Date of Patent: Feb. 27, 2024

(54) GENERATE DIGITAL SIGNATURE OF A QUERY EXECUTION PLAN USING SIMILARITY HASHING

(71) Applicant: INTERNATIONAL BUSINESS MACHINES CORPORATION, Armonk, NY (US)

(72) Inventors: Sweta Singh, Bangalore (IN); Vaibhav Murlidhar Kulkarni, Bangalore (IN); Mario Dominic Savio Briggs, Bangalore (IN); Deepak Anil Mahajan, Jamner (IN); Eitan Daniel Farchi, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 84 days.

(21) Appl. No.: 17/726,795

(22) Filed: Apr. 22, 2022

(65) Prior Publication Data

US 2023/0342356 A1 Oct. 26, 2023

(51) Int. Cl.
*G06F 16/2453* (2019.01)

(52) U.S. Cl.
CPC .. *G06F 16/24542* (2019.01); *G06F 16/24539* (2019.01)

(58) Field of Classification Search
None
See application file for complete search history.

(56) References Cited

U.S. PATENT DOCUMENTS

| 9,911,039 | B1* | 3/2018 | Brost | G06V 20/176 |
| 9,928,310 | B2 | 3/2018 | Ramen et al. | |
| 10,437,996 | B1 | 10/2019 | Li et al. | |
| 2016/0048607 | A1* | 2/2016 | Raman | G06F 16/90335 707/798 |
| 2017/0161375 | A1 | 6/2017 | Stoica et al. | |
| 2019/0171665 | A1 | 6/2019 | Navlakha et al. | |
| 2020/0311083 | A1* | 10/2020 | Mayr | G06F 16/2246 |
| 2020/0364223 | A1* | 11/2020 | Pal | G06F 16/24539 |
| 2021/0117425 | A1* | 4/2021 | Rao | H04L 9/0866 |
| 2021/0173841 | A1* | 6/2021 | Kotnis | G06F 16/322 |
| 2021/0216601 | A1* | 7/2021 | Galitsky | G06F 16/24564 |
| 2021/0349887 | A1* | 11/2021 | Alonzo | G06F 16/284 |
| 2023/0093332 | A1* | 3/2023 | Ithal | G06F 16/95 726/25 |

OTHER PUBLICATIONS

"Simhash and duplicate information recognition"; ProgrammerSought. com ; DMCA; 2018; 43 p.
(Continued)

*Primary Examiner* — Christopher J Raab
(74) *Attorney, Agent, or Firm* — CANTOR COLBURN LLP; Nicholas Welling

(57) ABSTRACT

Embodiments are for generating a digital signature of a query execution plan using similarity hashing. A technique includes generating a node digital signature for nodes in a query and generating an edge digital signature for edges in the query, the edges connecting the nodes. The technique includes selecting at least one previously executed query based on the node digital signature and the edge digital signature for the query and causing the query to be processed according to an assignment associated with the at least one previously executed query.

20 Claims, 16 Drawing Sheets

(56) References Cited

OTHER PUBLICATIONS

Aouiche, "Clustering-Based Materialized View Selection in Data Warehouses"; DBIS 2006: Advances in Databases and Information Systems pp. 81-95, March , 16p.
Kul, "Similarity Metrics for SQL Query Clustering"; IEEE Transactions on Knowledge and Data Engineering, vol. 30, No. 12, Dec. 2018; 13p.
Li, "Graph Matching Networks for Learning the Similarity of Graph Structured Objects"; Proceedings of the 36 th International Conference on Machine Learning, PMLR 97, 2019. 18p.

* cited by examiner

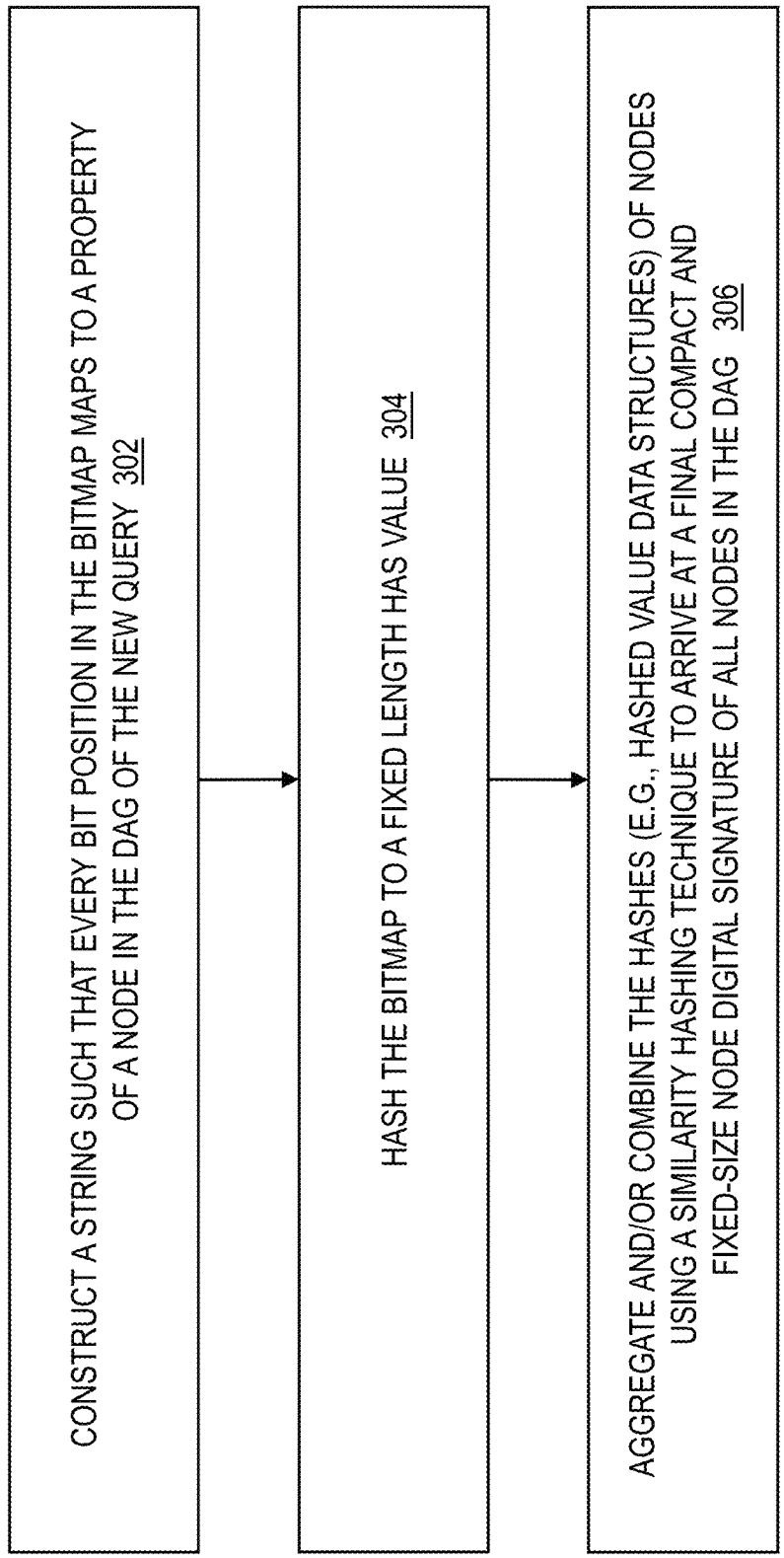

FIG. 3B 310

FOR EACH EDGE, CONSTRUCT A BITMAP FROM A SOURCE NODE TO A TARGET NODE CONNECTED BY THAT EDGE IN THE DAG OF THE QUERY, THEREBY RESULTING IN A BITMAP OF AN EDGE 312

COMBINE ALL THE EDGES OF THE DAG, SUCH THAT THE GRAPH TOPOLOGY AND THE ORDER OF THE OPERATORS ARE CAPTURED IN THE EDGE DIGITAL SIGNATURE 314

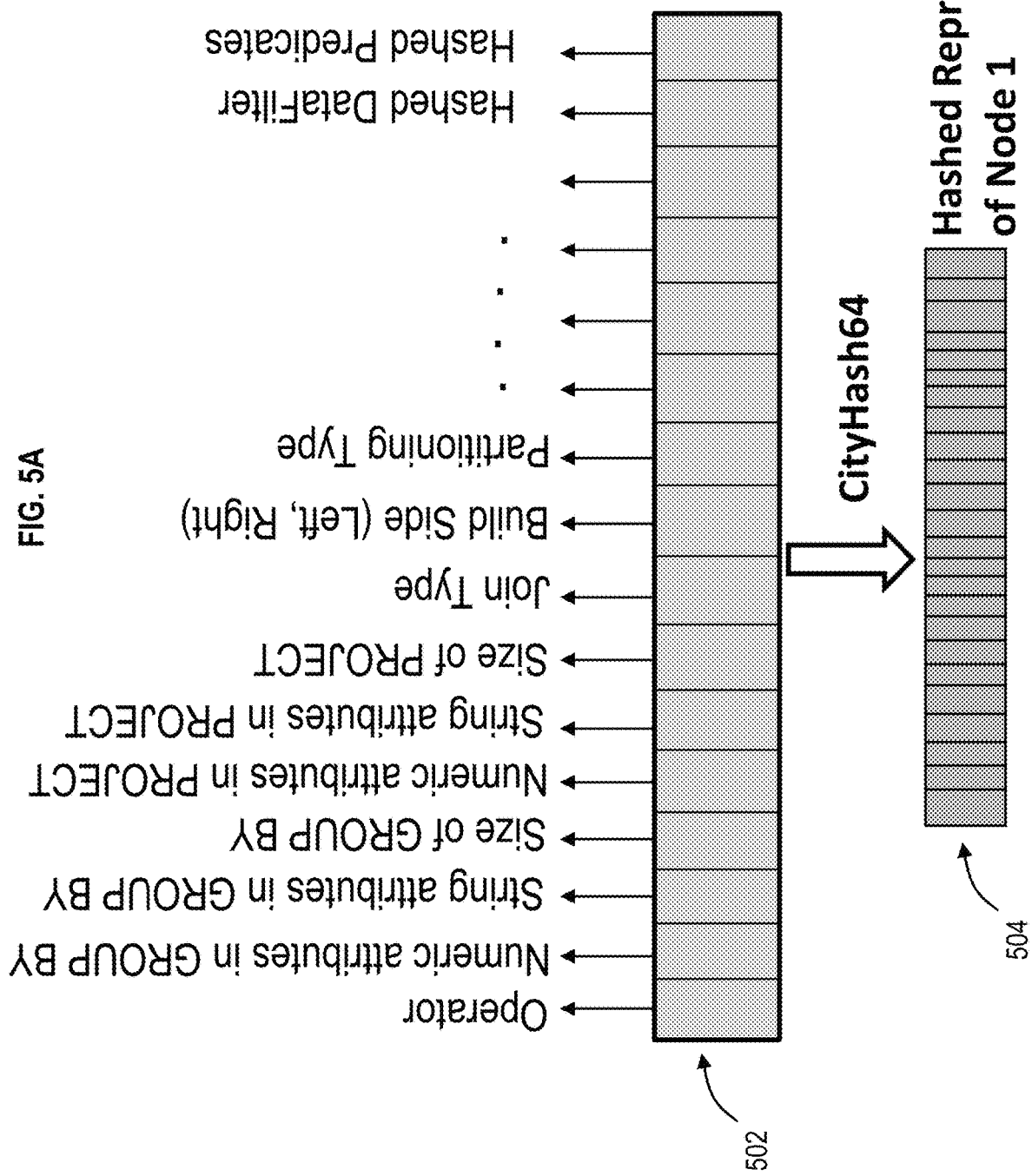

FIG. 7A

Algorithm 1: Computation of Structural representation of the graph

Result: 64 bit representation of the edges S(E)

inputs: QDAG G = (V,E)

where V is Nodes in the QDAG and E are the edges connecting the nodes $G_r$ = reverse_edges_of_QDAG(G) ;
forward_order = topological_sort(G);
backward_order = topological_sort($G_r$) ;
hash = 0 ;

where u and v are nodes connected by an edge.

foreach $(u,v) \in E$ do
    bitmapEdge = 0
    temp = operator_code[u] ;
    bitmapEdge += shift_left(temp) ;
    temp = forward_order[u] ;
    bitmapEdge += shift_left(temp) ;
    temp = backward_order[u] ;
    bitmapEdge += shift_left(temp) ;
    temp = in-degree[u];

FIG. 7B

ALGORITHM 1 (CONTINUED)

```
    bitmapEdge += shift_left(temp) ;
    temp = out-degree[u];
    bitmapEdge += shift_left(temp) ;
    temp = operator_code[v] ;
    bitmapEdge += shift_left(temp) ;
    temp = forward_order[v];
    bitmapEdge += shift_left(temp) ;
    temp = backward_order[v];
    bitmapEdge += shift_left(temp) ;
    temp = in-degree[v];
    bitmapEdge += shift_left(temp) ;
    temp = out-degree[v];
    bitmapEdge += shift_left(temp) ;
    bitMapEdges += bitMapEdge;
end
S(G) ← bitMapEdges;
```

FIG. 8

Algorithm 2: Algorithm for computing fingerprint of single node in Approach #1

Result: 64 bit representation for each node h(v)
inputs: Node v ∈ V
feature_vector ← [];
feature_vector.add(encoded_operator(v));
foreach *property p* ∈ *P* do
  | if property p in v then feature_vector.add(p)
end
return CityHash64( string( feature_vector ) )

FIG. 9

| Algorithm 3: Algorithm for summarizing fingerprints of all nodes in QDAG using simhash in Approach #1 |
|---|
| Result: 64 bit representation of the graph features $N(G)$ |
| inputs: QDAG $G = (V, E)$ |
| foreach *operator* $v \in V$ do |
|     hash($v$) ← vectorize( h($v$) ) |
|     weighted($v$) ← depth($v$) × hashV |
| end |
| foreach *bit in range(64)* do |
|     sum ← 0 |
|     foreach $v \in V$ do |
|         sum ← sum + weighted($v$)[bit] |
|     end |
|     if sum ¿ 0 then SimHashG[bit] ← 1 |
|     else SimHashG[bit] ← 0 |
| end |
| return SimHash |

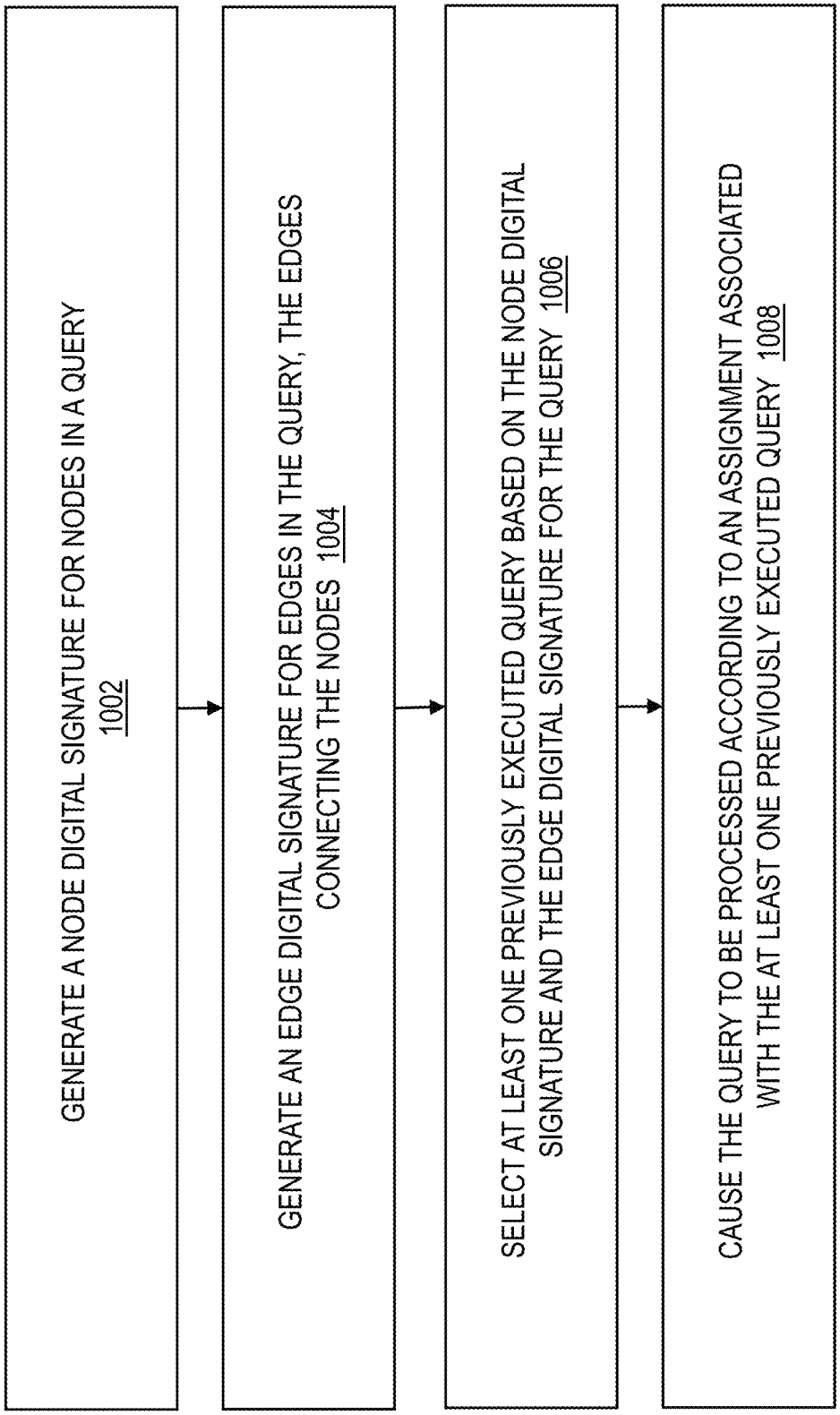

GENERATE DIGITAL SIGNATURE OF A QUERY EXECUTION PLAN USING SIMILARITY HASHING

BACKGROUND

The present invention generally relates to computer systems, and more specifically, to computer-implemented methods, computer systems, and computer program products configured and arranged to generate a digital signature of a query execution plan using similarity hashing.

In distributed computing environments, there can be numerous jobs or queries arriving as workloads to be processed using the computing resources of the computing environment. The queries are scheduled for processing in the computing environment.

SUMMARY

Embodiments of the present invention are directed to computer-implemented methods for generating a digital signature of a query execution plan using similarity hashing. A non-limiting computer-implemented method includes generating a node digital signature for nodes in a query plan and generating an edge digital signature for edges in the query plan, the edges connecting the nodes. The method includes selecting at least one previously executed query based on the node digital signature and the edge digital signature for the query and causing the query to be processed according to an assignment associated with the at least one previously executed query.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3A is a flowchart of a process for generating a node digital signature of a query directed acyclic graph according to one or more embodiments of the present invention;

FIG. 3B is a flowchart of a process for generating an edge digital signature of a query directed acyclic graph according to one or more embodiments of the present invention;

FIG. 5A depicts a block diagram of an example hashed value representation of a node as a hashed value data structure according to one or more embodiments of the present invention;

FIGS. 7A and 7B depict a block diagram illustrating an algorithm for computation of a structural representation of edges in the query directed acyclic graph according to one or more embodiments of the present invention;

FIG. 8 depicts a block diagram illustrating an algorithm for computation of a fingerprint of a single node according to one or more embodiments of the present invention;

FIG. 9 depicts a block diagram illustrating an algorithm for summarizing fingerprints of all nodes in the query directed acyclic graph according to one or more embodiments of the present invention;

FIG. 10 is a flowchart of a computer-implemented method for generating a digital signature of a query execution plan using similarity hashing according to one or more embodiments;

DETAILED DESCRIPTION

Figure 1:
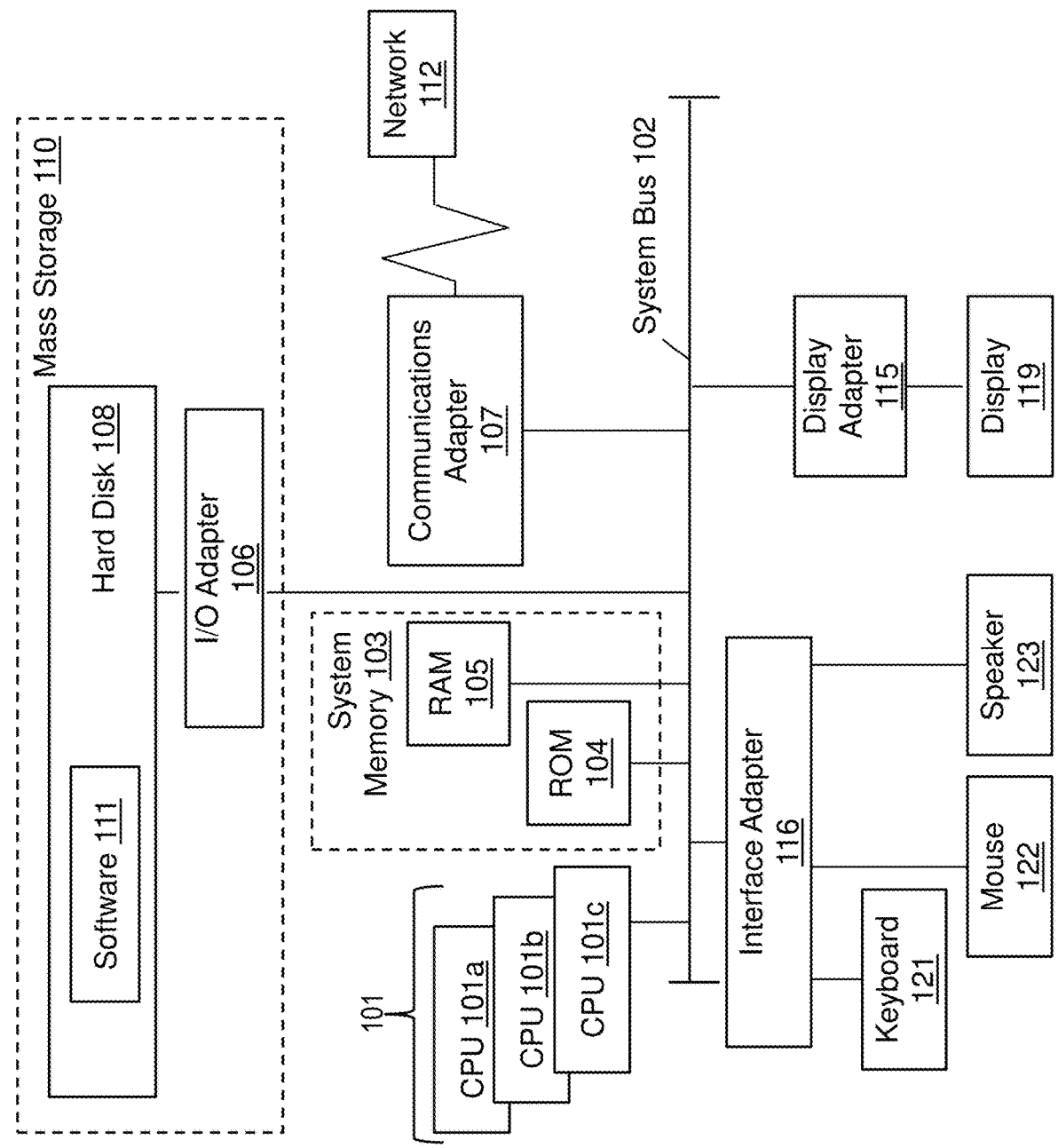
FIG. 1 depicts a block diagram of an example computer system for use in conjunction with one or more embodiments of the present invention.

Schedulers in large distributed systems often use various metrics related to the queries before execution to decide which tasks to schedule. Metrics, like query execution time and memory consumption, can be very useful for a scheduler to make such decisions. However, it may not be possible to calculate all these metrics before execution of the queries which is why predictions of the metrics are provided in one or more embodiments of the invention. One possible way of predicting is to save the queries' execution plan, along with runtime statistics, in a hash-table. If the scheduler receives a query whose execution plan is (exactly) similar to that of a previous query that the scheduler has seen earlier, then the scheduler can use the metrics from the previous execution of the query to schedule the execution of the new query. However, the scheduler may not receive the exact same queries in the computer system. In that case, the scheduler is configured to use similarity based hashing in the system in order to fetch information about the previously executed queries that are similar to the incoming (new) query, according to one or more embodiments of the invention. The fetched similar queries may not have the exact same structure of their execution plan as the new query but have some notion of similarity which can be used to obtain a prediction of the metrics like query completion time, complexity, memory consumption, etc., according to one or more embodiments of the invention. Although previous attempts at providing representation for queries include some machine learning models to calculate the similarity between the queries, one or more embodiments of the invention do not require machine learning models which themselves require training data, supervised learning, and correction. One or more embodiments of the invention utilize similarity hashing in the queries' domain for better estimation of run times and other metrics that can be useful for improving schedulers for computing systems.

The following terms are described below.

Schema—A schema defines how data is organized within a relational database; this is inclusive of logical constraints such as table names, fields, data types.

DAG—Directed Acyclic Graph.

QDAG—DAG that represents a query execution plan.

Nodes—Nodes are vertices in the DAG. These represent operators like scan, filter, join, etc.

Edges—An Edge connects two Nodes. Each edge is directed from one node to another such that following those directions will never form a closed loop.

Operator Code—Code for operators in software (e.g., Apache Spark™) like sort, filter, join, aggregate, etc.

Source Node—Node from which an edge starts.

Target Node—Node at which the edge ends.

InDegree—InDegree of a node is a number of edges coming to the node.

OutDegree—OutDegree of a node is number of edges coming out of the node.

Topological (DAG) ordering is a linear ordering of vertices such that for every directed edge uv from vertex u to vertex v, u comes before v in the ordering.

Topological Forward Order—Topological ordering of the node starting from the root.

Topological Backward Order—Topological ordering of the node in the reverse order.

Broadcast Exchange—is an operator in Apache Spark™ software to broadcast rows to other nodes in an Apache Spark™ cluster.

Directed acyclic graphs (DAGs) are commonly used in databases and Big Data computational engines like Apache Spark™ for representing the execution plan of queries. It should be appreciated that Big data is so large that it cannot reasonably be processed in the human mind with the aid of pen or paper. At times, such graphs or DAGs may be referred to as query directed acyclic graphs (QDAGs) or query DAGs. One or more embodiments of the invention use similarity hashing to arrive at a fingerprint such that the fingerprint embodies the compute requirements of the query for QDAGs. The fingerprint can be used to predict the runtime behavior of a new (incoming) query based on queries executed in the past having similar QDAGs.

According to one or more embodiments of the invention, generating the digital signature of query DAG may include the following operations:

1) Construct a string such that every position in the bitmap maps to a property of a node in the DAG, hashing the bitmap to a fixed length hash value, aggregating or combining all the hash values for all nodes in a single node digital signature.

2) Combining all the edges of the DAG such that the graph topology and the order of the operators are captured in an edge digital signature.

3) Matching of DAGs by comparing the edge digital signature and node digital signature.

When a new query enters the system, its node fingerprint and edge fingerprint (i.e., node digital signature and edge digital signature) are computed as discussed above. The node fingerprint and edge fingerprint of the new query are matching to fingerprints of previously executed queries. As such, the resource requirements of the matched query are the assigned/allocated resource requirements for the new query.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
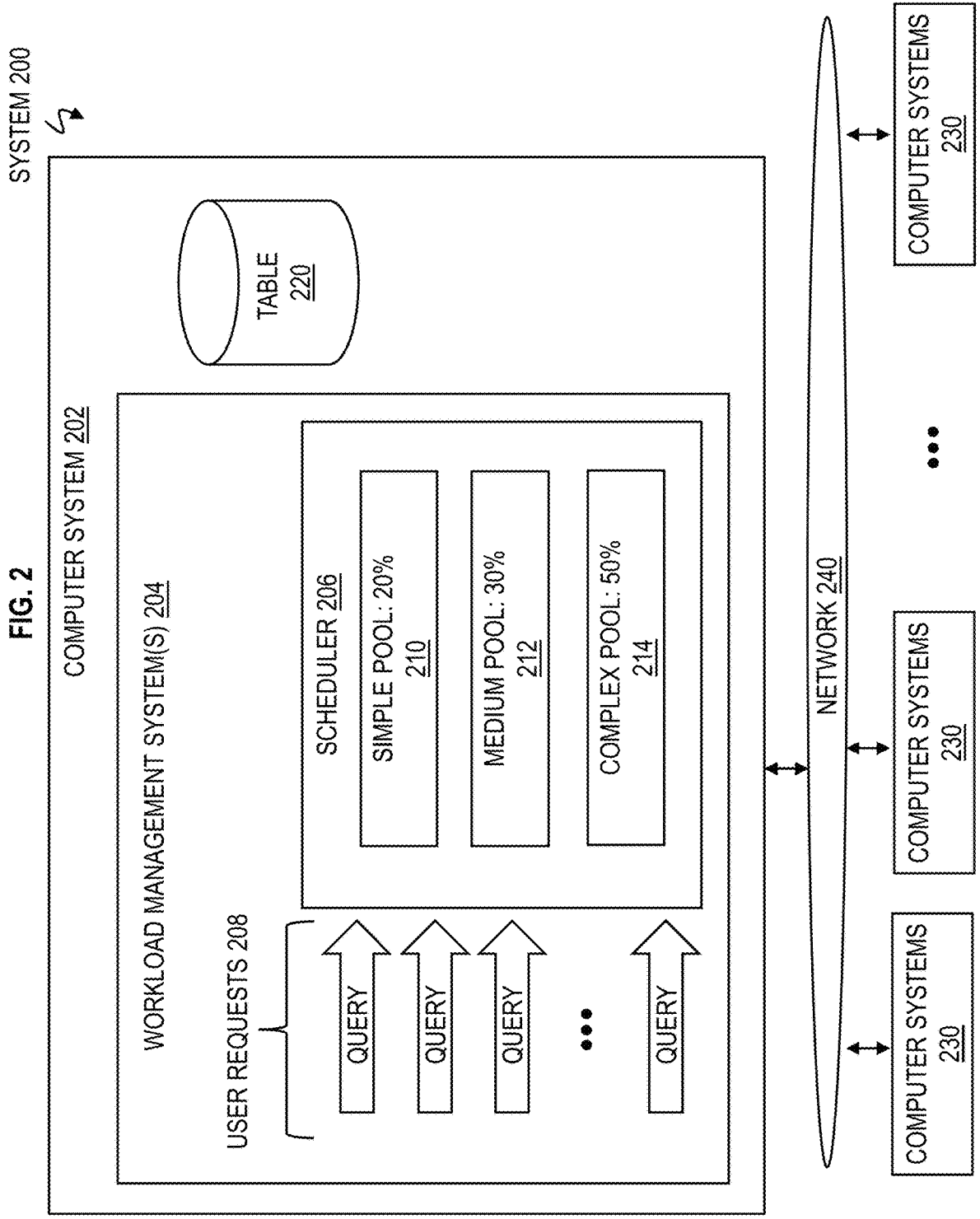
FIG. 2 depicts a block diagram of an example system configured to provide a digital signature of a query execution plan using similarity hashing in order to process a new query according to one or more embodiments of the present invention.

FIG. 2 depicts a block diagram of an example distributed computing system 200 configured to generate a digital signature of a query execution plan using similarity hashing in order to schedule the query for execution in the distributed computing system 200 according to one or more embodiments of the invention. In distributed computing system 200, there can be many interconnected computer system 202, 230 utilized for executing queries. Many computer systems 100 and/or features of computer systems 100 may be integrated in computer systems 202, 230 of distributed computing system 200. Computer system 202 and/or any of the computer systems 230 may include a workload management system 204, although workload management system 204 is illustrated on computer system 202 for explanation purposes. Workload management system 204 may include and/or be representative of various software applications such as software 111 which can be executed as instructions on one or more processors 101 in order to perform according to one or more embodiments of the invention. The distributed computing system 200 may be representative of one or more portions of a cloud computing environment 50 depicted in FIG. 11. Workload management system 204 may be incorporated and/or integrated in management layer 80 depicted in FIG. 12.

Workload management systems 204, in a database or data processing engine, intelligently schedule incoming requests or queries to ensure optimal utilization of computer resources for the distributed computing system 200. Workload management systems 204 act as a gatekeeper of the distributed computing system 200, admitting an optimal number of queries at a time, such that the stability and performance goals can be met for the distributed computing system 200. Queries that cannot be admitted, because they will affect the stability and performance of distributed computing system 200, are queued up for execution at a later point in time. Towards achieving the stability and performance goals, workload management systems 204 classify an incoming query based on its complexity. In one or more embodiments, the execution time of a query is directly proportional to its resource usage and can serve as a measure of complexity. The complexity of a query correlates to an amount of CPU usage, CPU time, memory utilization, I/O requirements, RAM usage, etc., required to complete the execution of the query. In order to execute an incoming query according to its required computer resources (i.e., complexity), workload management systems 204 can maintain a separate lane for each category, like a simple lane 210, a medium lane 212, and a complex lanes 214, each of which has its share of system computer resources in distributed computing system 200. These lanes 210, 212, 214 can then each be managed using different policies, such that the performance goals for each lane can be met. For example, for a simple lane 210 consisting of relatively short duration queries, fast response time may be important. Therefore, queries in the simple lane 210 can be ordered based on their estimated execution time. Furthermore, a query in simple lane 210 may not need lot of CPU cycles for execution, and as such the simple lane 210 can be allocated a lower CPU resource share. On the other hand, a complex query runs relatively longer and is resource intensive. Hence, queries in the complex lane 214 benefit from a higher share of CPU resources and are allocated a larger share of CPU resources in distributed computing system 200 than the simple and medium lanes 210, 212. Thus, predicting the complexity of a query accurately is core to building intelligent workload management systems 204. For explanation purposes and not limitation, simple lane 210 may be assigned 20% of computer resources, medium lane 212 may be assigned 30% of computer resources, and complex lane 214 may be assigned 50% of computer resources in distributed computing system 200. Executing incoming queries on the lanes that corresponds to their computer resource requires has the benefit of preventing stalls, allowing more queries to be executed, avoiding the inefficient use of computer resources which should have been allocated to a complex query instead of a simple query, etc., in distributed computing system 200.

Data processing engines like Apache Spark™ use DAGs (directed acyclic graphs) to represent execution plans for queries. The DAG includes vertices (or nodes) and edges, with each edge directed from one vertex (node) to another, such that following those directions will never form a closed loop. As noted herein, the DAG is used to represent a query execution plan as QDAG according to one or more embodiments. The vertices (or nodes) represent operators like scan, filter, join, aggregation, etc. The structure of QDAG represents the order of execution and dependency between these operators. Usually, the complexity of queries depends on the number and type of vertices (or nodes) and edges in the QDAG. The higher the number of vertices and edges in a QDAG, the more complex the execution of a query is. However, this may not always be the true. For example, a query which joins multiple small tables, might have high number of nodes and vertices in the DAG, but since the volume of data processed is small, the execution time or complexity of the query might be low. Similarly, a query which joins a few very large tables may have few nodes and edges in the DAG, but since the volume of data is high, the execution time or complexity of the query can be high. The workload management system 204 can understand/determine the complexity of the incoming query, for example, depicted as a user request 208, by finding a similar query from previously executed queries in previously executed queries in a lookup table 220. This requires a way to compare the similarity between QDAGs of the incoming queries and the previously executed queries. Although one way to measure the similarity could be to learn vector embedding of a plan using machine learning, this method has its own set of challenges because it requires a training phase and availability of a labelled dataset.

In accordance with one or more embodiments, a method is provided for determining the similarity for QDAGs using a similarity estimation technique. An example is the similarity estimation technique, called simhash, by Moses S. Charikar. One or more embodiments may use a dimensionality reduction technique that maps high-dimensional vectors to small-sized fingerprints. One or more embodiments can generate a compact 128-bit fingerprint of a QDAG which includes a node fingerprint and edge fingerprint, such that similar QDAGs have similar fingerprints for comparison.

Workload management system 204 can utilize this concept of QDAG fingerprints to understand the complexity of incoming queries. Workload management system 204 can maintain an in-memory lookup table 220 that stores QDAG fingerprints of past query execution instances, along with their metrics such as execution time and their lane assignment. When a new query arrives, the fingerprint of the QDAG for the new query can be matched to fingerprints of QDAGs for previously executed stored in the in-memory lookup table 220. The matched query's complexity can be used to predict the incoming query's complexity, such that the same lane can be assigned and the new query accordingly executed in the distributed computing system 200.

FIG. 3A is a flowchart of a process 300 for generating a node digital signature (i.e., node fingerprint) of a query DAG according to one or more embodiments. As noted herein, workload management system 204 receives an incoming query as a user request 208 that needs to be processed by the distributed computing system 200. The workload management system 204 has to assign the incoming query to a lane, for example, the simple lane 210, medium lane 212, or complex lane 214 according to computer resources required to process the type of incoming query.

Figure 5B:
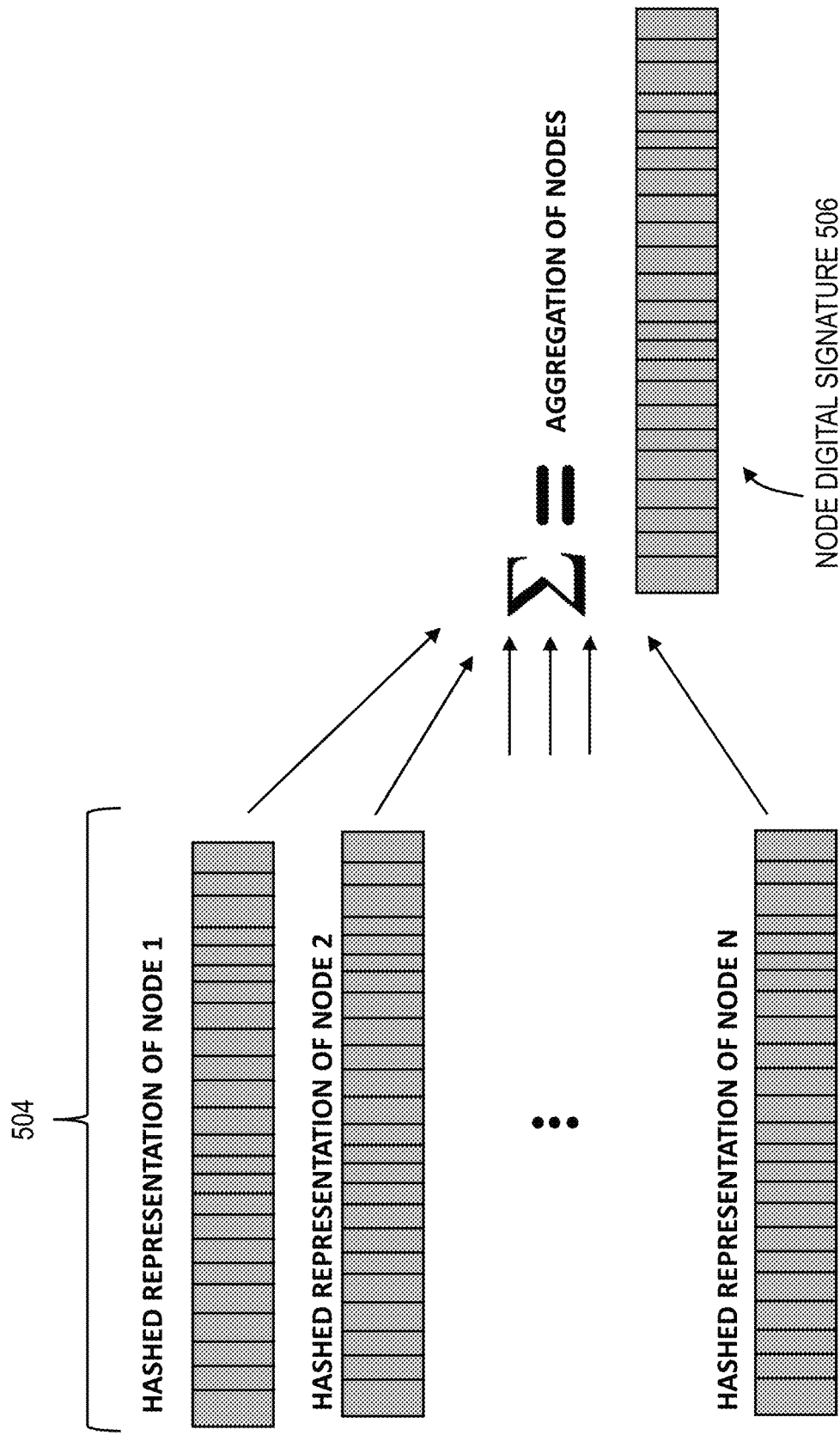
FIG. 5B depicts a block diagram of hashed value data structures utilized to form a node digital signature according to one or more embodiments of the present invention.

At block 302, workload management system 204 is configured to construct a string such that every bit position in the bitmap maps to a property of a node in the DAG of the new query. Each property is a vector in the string. FIGS. 5A and 5B depict an example of fingerprinting nodes according to one or more embodiments. In FIG. 5A, an example string 502 is illustrated with positions of properties of a node in a DAG for a query. Example properties of the node that have been mapped to positions in the string 502 include operator, numeric attributes in group by, string attributes in group by, size of group by, numeric attributes in Project, string attributes in Project, size of Project, join type, build side (left, right) partitioning type, . . . hashed datafilter, hashed predicates.

For each node in the DAG, workload management system 204 is configured to fetch important features (i.e., properties) and create a vector of these features, which are eventually used to create string 502 in FIG. 5A. Workload management system 204 uses fuzziness in feature representation by not using schema specific details like column names. After obtaining the features, the workload management system 204 concatenates all these features into the string 502 where the characters spans in this string are fixed for specific features/properties of the query. For example, the first five bit positions are fixed for the query operator name. If the operator name is shorter than five bits, the workload management system 204 can pad a few zeros at the end in order to make it a length of five bits for the vector. This process is utilized to construct the node representations.

Referring to FIG. 3A, at block 304, workload management system 204 is configured to hash the bitmap to a fixed length hash value. It is noted that blocks 302, 304 are performed for each node (i.e., vertices) in the DAG for the new query. FIG. 5A illustrates an example of a hashed value representation of example node 1 as a hashed value data structure 504. Workload management system 204 may use a hash function, such as Cityhash, to create a 64 bit hashed value data structure 504 for each respective node in the new query.

In other words, after building the string 502 with feature vectors of the properties of a node, workload management system 204 is configured to perform a hash of the feature vectors in string 502 to arrive at a compact and fixed-size bit representation of a given node in the DAG, which is illustrated as the hashed value data structure 504. Although FIG. 5A illustrates the hashed representation of a single node, it should be appreciated that there is a hashed representation for each node in the DAG of the new query. FIG. 5B depicts a block diagram of numerous hashed value data structures 504, each being a fixed-size bit representation of a given node in the DAG. There could be a total of 1-N nodes in the DAG for the new query, where "N" denotes the last node in the DAG. Accordingly, there are 1-N hashed value data structures 504 illustrated in FIG. 5B.

Referring to FIG. 3A, at block 306, workload management system 204 is configured to aggregate and/or combine the hashes (e.g., hashed value data structures 504) of nodes using a similarity hashing technique to arrive at a final compact and fixed-size node digital signature 506 of all nodes in the DAG.

As an example, the following operations may be utilized to aggregate all the hashes (e.g., hashed value data structures 504) into a compact node fingerprint using simhash. Let h represent the fixed length intermediate hash of each node and H represent the final node fingerprint. It is assumed that $h\_i$ represents ith bit of hash H, where $h\_i$ "belongs to" $\{0,1\}$. Also, $W\_h$ represents the weight of hash h corresponding to each node. This weight can be assigned based on the depth of the node. For query execution plans, the nodes with a higher depth are the ones which represent I/O actions and hence have a larger effect on the runtime; accordingly, workload management system 204 is configured to give greater weight to nodes with a higher depth. The weight represents how much importance is to be given to that particular node when calculating the simhash of the whole graph for all of the hashed value data structures 504. For simplicity in the example below, it is assumed that all the weights are set to 1. For simplicity, it is assumed that $W\_h=1$ for all h "belonging to" H.

For each position i "belonging to" [1,64]
calculate $\text{final}[i]=\Sigma\_(h \text{ "belongs to" } H, h\_i=1) W\_h - \Sigma\_(h \text{ "belongs to" } H, h\_i=0) W\_h$;
$\text{SimHash}(H)=f$ where $f\_i=1$ if $\text{final}[i]>0$ else $f\_i=0$.

Aggregating hashed value data structures 504 representing each node in the new query using simhash results in the fixed-size node digital signature 506. Similarity hashing ensures that, if two DAGs are similar (e.g., similar between a new query (i.e., a user request 208) and a previously executed query in lookup table 220), the Hamming distance between the simhash of the two DAGs will be small. For example, for the new query to be considered similar to the previously executed query, the Hamming distance will meet and/or be less than a node similarity threshold. It is noted that a weight may be added to a particular property at a certain position within the hashed value data structure 504, and/or a weight may be added to a particular hashed value data structure 504 representing a particular node. The added weight increases the value or importance.

FIG. 3B is a flowchart of a process 310 for generating an edge digital signature of a query DAG according to one or more embodiments. As noted herein, workload management system 204 receives an incoming query as the user request 208 that needs to be processed by the distributed computing system 200, and the node digital signature 506 for the query is prepared as discussed above. FIG. 3B illustrates the generation of an edge digital signature 606 (e.g., depicted in FIG. 6B) for the same query. The node digital signature 506 may be generated concurrently with, after, and/or before the edge digital signature 606.

Figure 6A:
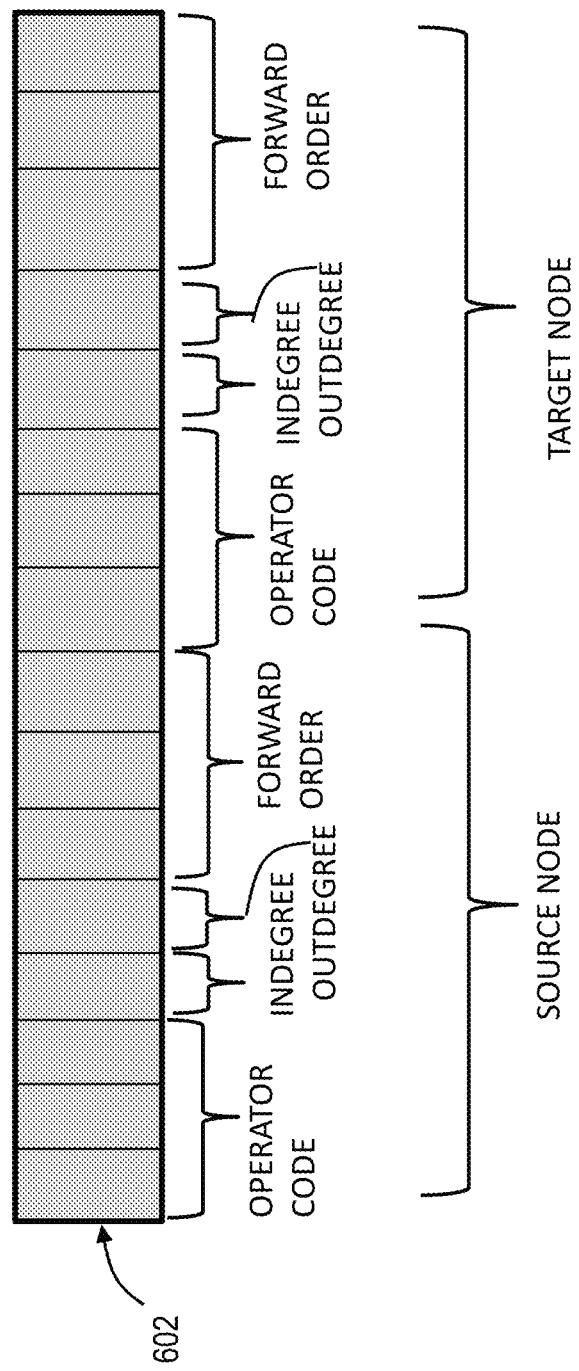
FIG. 6A depicts a block diagram of an example bitmap of an edge according to one or more embodiments of the present invention.

At block 312 of process 310, workload management system 204 is configured to, for each edge, construct a bitmap from a source node to a target node connected by that edge in the DAG of the query, thereby resulting in a bitmap 602 of an edge as depicted in FIG. 6A. In order to encode DAG edges, workload management system 204 is configured to take into consideration a start node. For simplicity and ease of understanding, the start node can be set to the root node in the DAG. From the start node, workload management system 204 is configured to get the ancestor nodes (previous nodes leading to this node if any) and successor nodes (subsequent nodes if any) of the start node and give them a topological order. It should be appreciated that the root node does not have any ancestor nodes. This topological order, which is a linear ordering, provides the ancestor nodes and successor nodes with an identity relative to the starting node. Workload management system 204 encodes the node operators such that each operator is uniquely encoded within the bitmap 602. Each property is encoded in a bitmap, e.g., operator1 is encoded as 00001, operator2 is encoded as 00010, etc. The bitmap 602 of the edge includes the following properties for both the source node and target node, and each property occupies a fixed position in the bitmap 602.

Example properties captured in the bitmap 602 of the edge include the node operator, the topological forward order (e.g., the number of sub-nodes below the node), the topological backward order (e.g., parent nodes), in-degree (number of incoming edges to a node), and out-degree (number of outgoing edges from the node). To construct the compact edge fingerprint, workload management system 204 is configured to traverse through all the edges in the DAG starting from root node; for each edge, a corresponding bitmap 602 is constructed for the source node and target node connected by that edge, as illustrated as the bitmaps 602 of edges 1-n in FIG. 6B, where "n" is the last of the edges in the DAG for the query. Each edge has a source node and target node, and an order/direction in which the edge points.

Referring to FIG. 3B, at block 314, workload management system 204 is configured to combine all the edges of the DAG, such that the graph topology and the order of the operators are captured in the edge digital signature 606. For example, using binary arithmetic addition, workload management system 204 is configured to add all the bitmaps 602 of all the edges to arrive at a single bitmap which is referred to as the edge digital signature 606.

Figure 4:
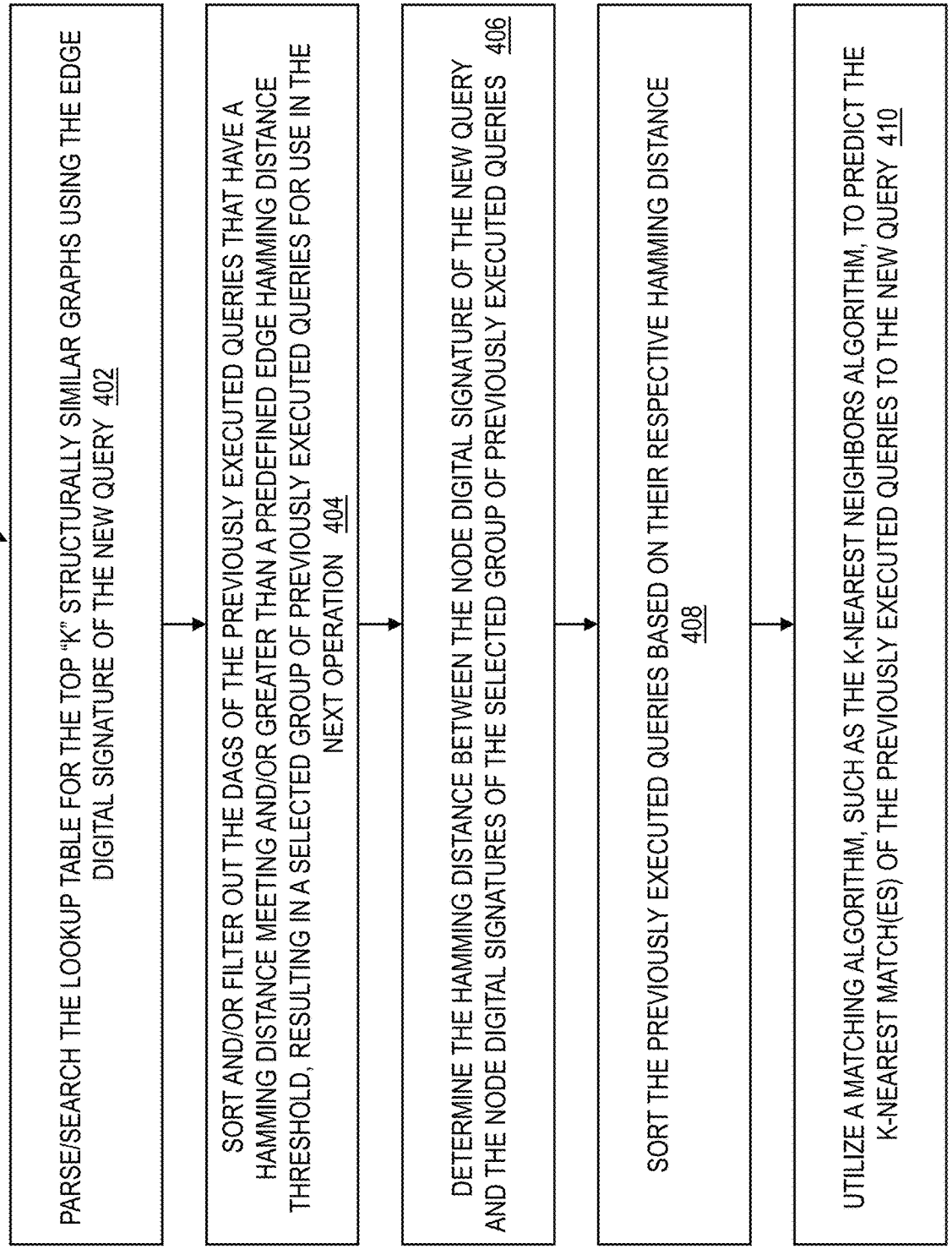
FIG. 4 is a flowchart of a process for matching query directed acyclic graphs by comparing a node digital signature and edge digital signature of a new query to the node digital signatures and edge digital signatures of previously executed queries according to one or more embodiments of the present invention.

Now turning to FIG. 4, a flowchart of a process 400 is provided for matching DAGs by comparing the node digital signature 506 and edge digital signature 606 of the new query to the node digital signatures and edge digital signatures of respective previously executed queries in lookup table 220 according to one or more embodiments.

At block 402, workload management system 204 is configured to parse/search the lookup table 220 for the top "K" structurally similar graphs using the edge digital signature 606 of the new query. A similarity function may be utilized to compare the edge digital signature 606 for the new query to the edge digital signatures of the previously executed queries in order to find the top "K" structurally similar previously executed queries (DAGs) in lookup table 220. For example, workload management system 204 is configured to calculate the Hamming distance between the edge digital signature 606 and each of the edge digital signatures of DAGs for the previously executed queries in the lookup table 220. The top "K" could be predefined as a percentage, such as the top 5%, 10%, 15%, 25%, etc., and/or an amount, such as the top 10, 20, 30, etc.

At block 404, workload management system 204 is configured to sort and/or filter out the DAGs of the previously executed queries that have a Hamming distance meeting and/or greater than a predefined edge Hamming distance threshold, resulting in a selected group of previously executed queries for use in the next operation.

At block 406, workload management system 204 is configured to determine the Hamming distance between the node digital signature 506 of the new query and the node digital signatures of the selected group of previously executed queries (e.g., selected at block 404).

At block 408, workload management system 204 is configured to sort the selected previously executed queries based on their respective Hamming distance. The lower/smaller the Hamming distance the better, which means there is a higher likelihood of being a match to the new query. Workload management system 204 may utilize the top n previously executed queries, where the top n could be predefined as a percentage, such as the top 5%, 10%, 15%, 25%, etc., and/or an amount, such as the top 10, 20, 30, etc.

At block 410, workload management system 204 is configured utilize a matching algorithm, such as the k-nearest neighbors algorithm, to predict the k-nearest match(es) of the previously executed queries to the new query. Workload management system 204 is configured to use the runtime characteristics of the k-nearest matches to select and/or schedule the corresponding lane 210, 212, 214 to utilize for processing the new query. In one or more embodiments, the workload management system 204 can take the weighted average of the runtimes of these k-nearest matches in order to select the corresponding lane 210, 212, 214, the weights being the relative distance of the matches. In one or more embodiments, the best k-nearest match can be selected. In one or more embodiment, the top k-nearest matches can be selected where the top could be predefined as a percentage of the k-nearest matches, such as the top 5%, 10%, 15%, 25%, etc., and/or an amount of the k-nearest matches, such as the top 10, 20, 30, etc.

For explanation purposes and not limitation, example Algorithms 1, 2, and 3 are discussed below for fingerprinting with simhash as discussed herein. Algorithms 1, 2, and 3 are implemented in workload management system 204. Simhash possesses two properties: (A) The fingerprint of a QDAG is a "hash" of features/properties of all the nodes, and (B) Similar QDAGs have similar hash values. The latter property is atypical of hash-functions. For illustration, consider two QDAGs that differ in a very small way. Consider two queries with similar QDAGs except for different column names in the project operation. In this case, hash functions like Cityhash or MurMurHash will hash these two QDAGs (treated as strings) into two completely different hash-values, i.e., the Hamming distance between the hash values would be large. However, simhash will hash them into similar hash-values, i.e., the Hamming distance would be small, as utilized in accordance with one or more embodiments.

Let V represent the n-bit final fingerprint. Each node and its properties in a QDAG are hashed into an n-bit hash value. These n bits increment/decrement the n components of the vector, V, as follows: if the i-th bit of the hash value is 1, the i-th component of V is incremented by 1; if the i-th bit of the hash value is 0, the i-th component of V is decremented by 1. When all nodes have been processed, some components of V are positive while others are negative. The signs of components determine the corresponding bits of the final fingerprint, V.

The node digital signature, which is the node's fingerprint, is arrived at by carefully engineering each property of the node using positional encoding. The properties are kept schema independent. Examples of properties are the number of string and numeric attributes in grouping expressions, result expressions, keys of join and project operator, join type, partitioning type, mode of BroadcastExchange, etc. The encoding of a node, thus obtained, is hashed to a 64-bit vector. The hash of all nodes are combined using simhash.

After parsing and extracting the node features, the workload management system 204 creates a vector of features/properties for each node in the QDAG as shown in FIGS. 5A and 5B. For node v∈V, the approach represents the set of features by f(v). After getting f(V) for each node v, the workload management system 204 is configured to convert f(v) into a string 502 and then hash the string 502 using Cityhash to create the 64-bit hashed value data structure 504, as shown in Algorithm 2 in FIG. 8. This hash of the node v is denoted by h(v). This acts as a representation of the node features for the node v. After getting h(v), which is a representation for each node in the QDAG, an aggregation method is utilized in order to summarize all nodes into a single hash.

Algorithm 3 for summarizing all the nodes is depicted in FIG. 9, and this final hash is a compact fingerprint (e.g., node digital signature 506) of the whole QDAG. For summarizing the node features of the whole graph, the simhash algorithm is utilized; given the hashes of all the nodes in the graph (h(v) ∀v∈V), the workload management system 204 calculates the Simhash(V) which is a 64 bit representation of the whole graph G. Let the $i^{th}$ bit of h(v) be h(v)$_i$∀i∈[1, 64]. Now, for weights $W_v$∀v∈V, the workload management system 204 finds bitcount for all bit positions and represent it by an array BitCounts. Therefore, BitCount$_i$= $\Sigma_{v\in V, h(v)i=1} W_v - \Sigma_{v\in V, h(v)i=0} W_v$, and the final hash of the graph can be found by checking which positions in BitCounts are positive.

Simhash(G)$_i$=1 if BitCount$_i$>0

0 if BitCount$_i$≤0

This gives the final 64-bit representation (e.g., node digital signature 506) for the node features of the graph. So, N(G)=Simhash(G).

Figure 6B:
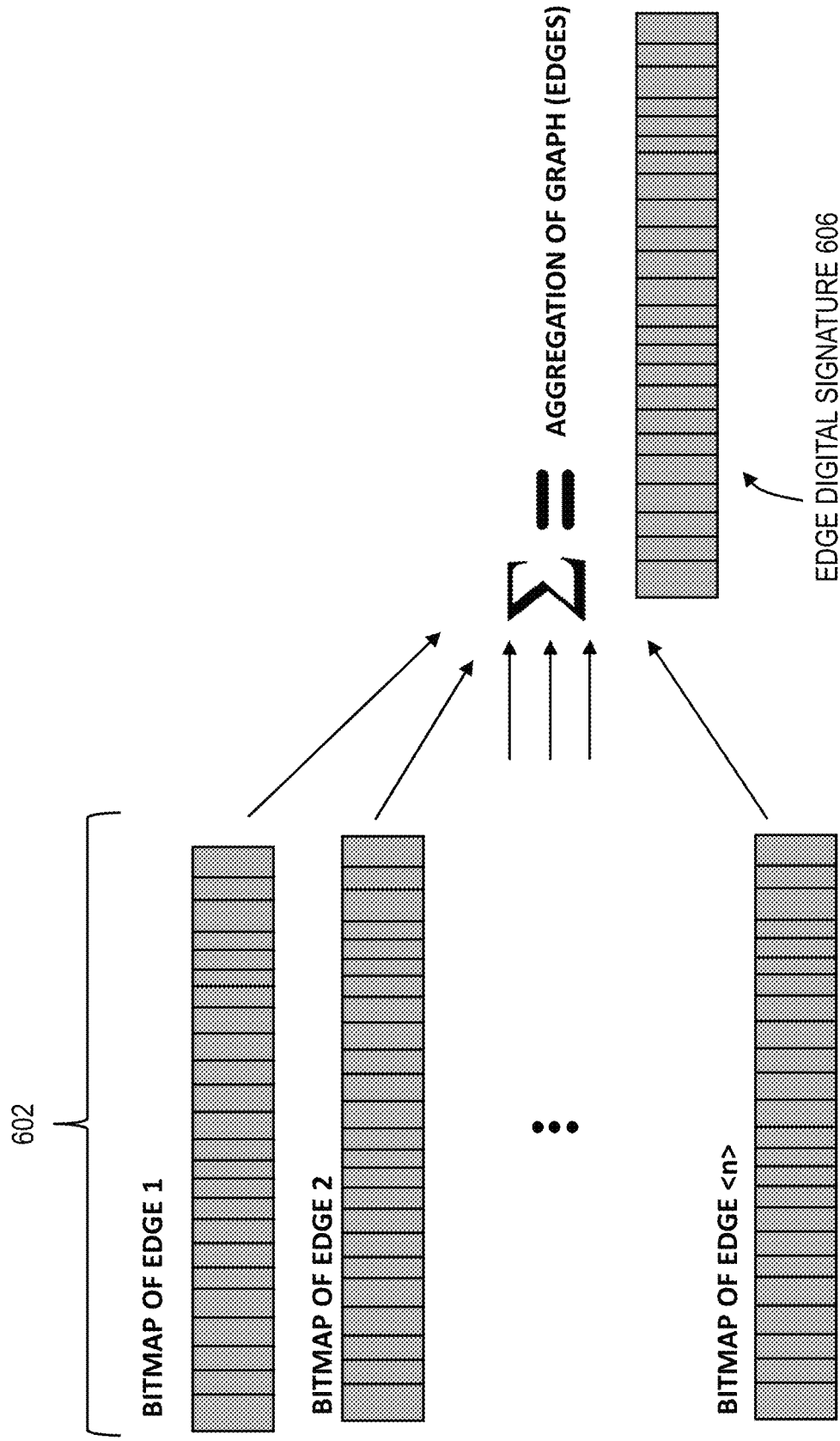
FIG. 6B depicts a block diagram of bitmaps of edges in the query directed acyclic graph utilized to form an edge digital signature according to one or more embodiments of the present invention.

In summarizing edges of QDAG, for each edge in the QDAG, the workload management system 204 finds the forward topological order, backward topological order, in-degree, out-degree, and operator of the connecting source and target nodes. After computing these properties, the management workload system 204 generates a bitmap vector of an edge using positional encoding. In this method, every bit in the vector represents an edge attribute as depicted in FIG. 6A. The management workload system 204 adds the vector of all the edges to arrive at the final representation (e.g., edge digital signature 606) of the QDAG, as depicted in FIG. 6B. The pseudo code for the hash calculation can be found in Algorithm 1, depicted in FIGS. 7A and 7B. The shift left function in Algorithm 1 shifts the bits by a constant number of positions to the left.

Turning to further details regarding matching QDAGS using fingerprints, in order to perform the similarity matching for QDAGs, workload management system 204 is configured to compute and persist the fingerprints of the edges and nodes of QDAGs of past query executions (i.e., previously executed queries) in an in-memory hash map (e.g., lookup table 220). When a new query (e.g., user request 208) is received by the workload management system 204, workload management system 204 computes two 64-bit signatures for the edges (S(Gkey)) (e.g., edge digital signature 606) and nodes N(Gkey) (e.g., node digital signature 506) which are matched using the following two-step process.

1) First, workload management system 204 finds a constant number of QDAGs that are similar to the given QDAG in terms of edges. For this, workload management system 204 is configured to calculate the Hamming distance between S(Gkey) (e.g., edge digital signature 606) and S(G) ∀G∈G (e.g., edge digital signatures of previously executed queries) where G is the set of all the QDAGs in the lookup table 220. After calculating the Hamming distance, the workload management system 204 filters out the QDAGs with the least Hamming distance. Let the set of the QDAGs that are obtained after this filtering be C. It is noted that |C|=k(constant).

2) Second, after getting the set C, workload management system 204 finds the Hamming distance between N(Gkey) (e.g., node digital signature 506) and N(G)∀G∈C (e.g., node digital signatures of previously executed queries having been obtained by the filtering above) in lookup table 220 and sort them in increasing order of the Hamming distance. These results are the nearest neighbors and/or the final matches for the given QDAG Gkey.

Accordingly, workload management system 204 predicts the complexity of the QDAG for new query. In one or more embodiments, workload management system 204 predicts the complexity of a given QDAG by using the k-nearest neighbors algorithm. Using the matching algorithm, workload management system 204 finds the nearest neighbor of the given QDAG using its fingerprint. The complexity of that nearest neighbor is the predicted complexity of the given QDAG for the new query. As such, the new query is assigned for processing by the distributed computing system 200 according to the corresponding simple lane 210, medium lane 212, or complex lane 214 that is the same complexity for the nearest neighbor and/or matching neighbors. Accordingly, the new query is processed using the pre-allocated compute resources (i.e., CPU, memory, I/O, etc.) of the computer systems in the distributed computing system 200 for the assigned lane, simple lane 210, medium lane 212, or complex lane 214, based on the match.

There are various technical solutions and benefits provided by generating a digital signature of a query execution plan using similarity hashing according to one or more embodiments. Technical solutions provide the ability to hand-pick important features of operators that can be useful in predicting complexity of a new query. Features like the type of join (hash join, sort merge join, broadcast join, inner, outer, antijoin, semijoin), which side of the join is the build side (left, right), the type of output partitioning (hash partition, range partition, or single partition), and number of partitions are represented in the fingerprint. Technical solutions provide the flexibility to engineer features in such a way that they are independent of the schema, and hence, can be generalized. To achieve this, one or more embodiments avoid references to table names or column names. Instead, one or more embodiments use the data type of columns, number of numeric columns, number of string columns, and width of rows. Technical solutions provide the ability to building position based encoding where every position in the vector always represents a specific property of the operator, thereby making this approach more interpretable. Further, technical solutions provide the ability to incorporate "insider" information, which is not very obvious to one not familiar with the workings of the query optimizer. For example, in Apache Spark™, there are special operators used for an optimizations. Accurately representing such features improves the ability of the algorithms to match such operators across different QDAGs and infer its complexity.

Workload management system 204 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, workload management system 204 described herein can be a combination of hardware and programming. The programming can be processor executable instructions stored on a tangible memory, and the hardware can include processing circuitry for executing those instructions. Alternatively or additionally, one or more portions of workload management system 204 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

FIG. 10 is a flowchart of a computer-implemented method 1000 for generating a digital signature of a query execution plan using similarity hashing according to one or more embodiments. Reference can be made to any of the figures discussed herein.

At block 1002, workload management system 204 on computer system 202 is configured to generate a node digital signature 506 for nodes in a (new) query (e.g., a user request 208). At block 1004, workload management system 204 is configured to generate an edge digital signature 606 for edges in the query (e.g., a user request 208), the edges connecting the nodes. At block 1006, workload management system 204 is configured to select at least one previously executed query (e.g., in lookup table 220) based on the node digital signature and the edge digital signature for the query. At block 1008, workload management system 204 is configured to cause the query to be processed according to an assignment (e.g., simple lane 210, medium lane 212, complex lane 214, each lane utilizing a different amount of computer resources (e.g., 20%, 30%, 50%, respectively)) associated with the at least one previously executed query.

The node digital signature 506 comprises properties of the nodes in a directed acyclic graph, the directed acyclic graph being a representation of the nodes and the edges in the query. The edge digital signature 606 comprises properties associated with the edges and a topological ordering of the nodes in a directed acyclic graph, the directed acyclic graph being a representation of the nodes and the edges in the query.

In one or more embodiments, the at least one previously executed query has another node digital signature (e.g., in lookup table 220); and selecting the at least one previously executed query based on the node digital signature and the edge digital signature for the query is based, at least in part, on the another node digital signature.

The at least one previously executed query has another node digital signature and another edge digital signature (e.g., in lookup table 220); and selecting the at least one previously executed query based on the node digital signature and the edge digital signature for the query comprises: determining the at least one previously executed query from a plurality of previously executed queries (e.g., in lookup table 220) based, at least in part, on the another edge digital signature; and in response, further determining that the lane assignment (e.g., simple lane 210, medium lane 212, complex lane 214 in lookup table 220) of the at least one previously executed query is to be utilized for processing the new query based, at least in part, on the another node digital signature.

A similarity function (e.g., simhash) is utilized to generate the node digital signature 506 from a plurality of hashed representations 504 of the nodes for the query. An aggregation is utilized to generate the edge digital signature 606 from a plurality of bitmaps 602 of the edges for the query.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
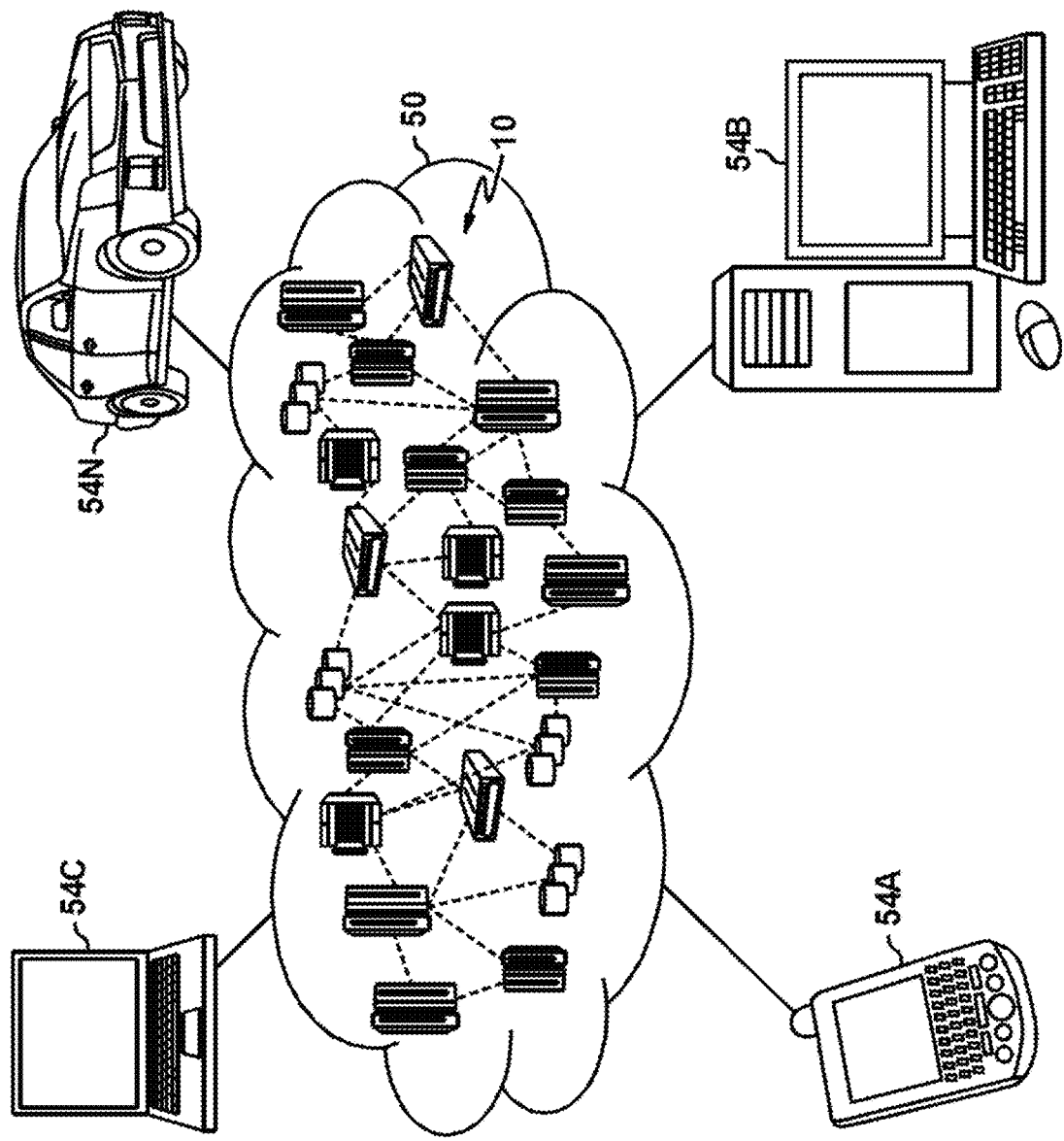
FIG. 11 depicts a cloud computing environment according to one or more embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
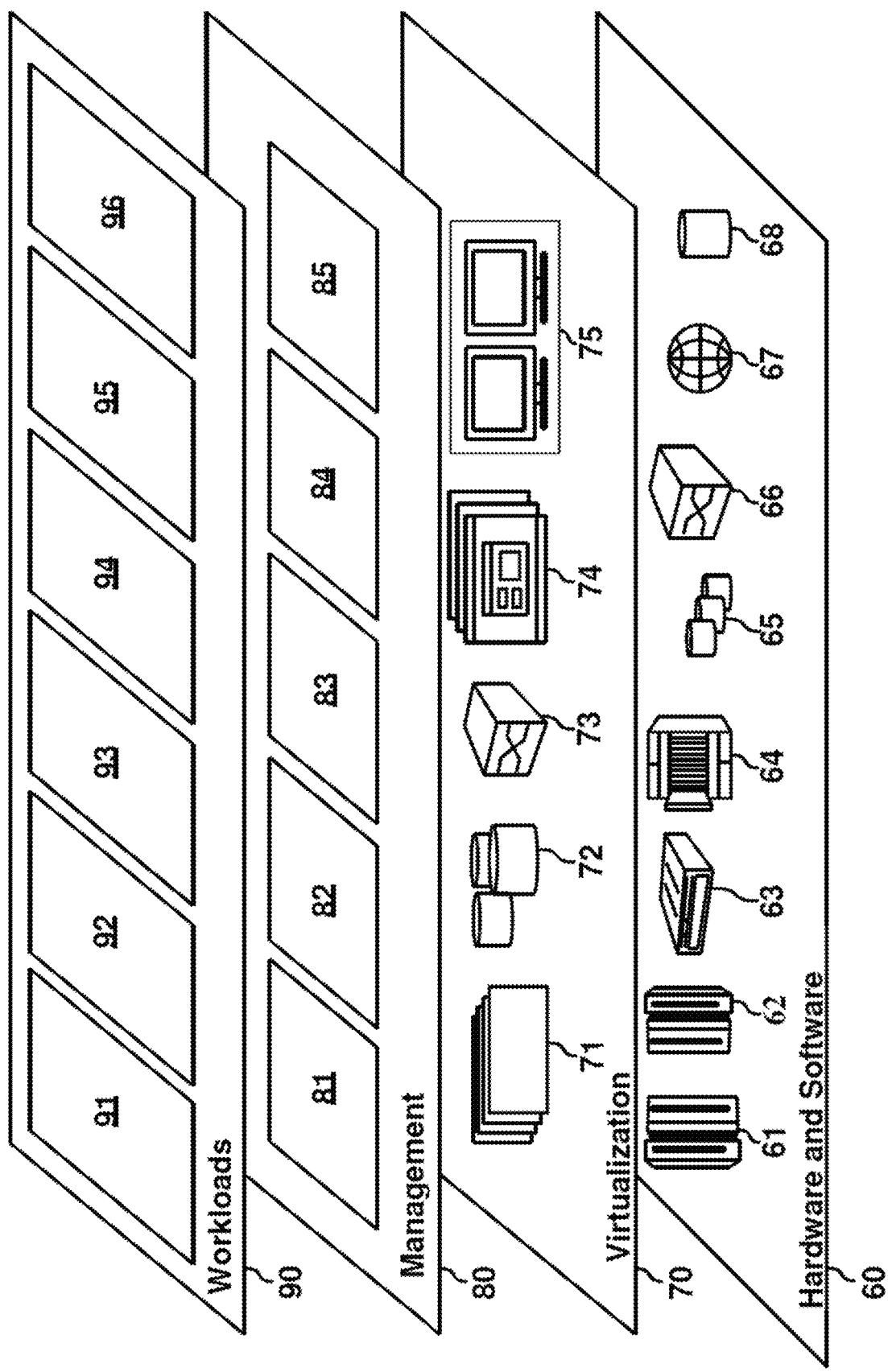
FIG. 12 depicts abstraction model layers according to one or more embodiments of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. In one or more embodiments, the workload management systems 204 may be included in and/or be integrated in Resource provisioning 81 of management layer 80.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:
1. A computer-implemented method comprising:
generating a node digital signature for nodes in a query;
generating an edge digital signature for edges in the query, the edges connecting the nodes;

selecting at least one previously executed query based on the node digital signature and the edge digital signature for the query; and causing the query to be processed according to an assignment associated with the at least one previously executed query, wherein the at least one previously executed query has another node digital signature and another edge digital signature, the selecting further comprising determining that the assignment of the at least one previously executed query is to be utilized for processing the query based, at least in part, on the another node digital signature.

2. The computer-implemented method of claim 1, wherein the node digital signature comprises properties of the nodes in a directed acyclic graph, the directed acyclic graph being a representation of the nodes and the edges in the query.

3. The computer-implemented method of claim 1, wherein the edge digital signature comprises properties associated with the edges and a topological ordering of the nodes in a directed acyclic graph, the directed acyclic graph being a representation of the nodes and the edges in the query.

4. The computer-implemented method of claim 1, wherein
selecting the at least one previously executed query based on the node digital signature and the edge digital signature for the query is based, at least in part, on the another node digital signature.

5. The computer-implemented method of claim 1, wherein
selecting the at least one previously executed query based on the node digital signature and the edge digital signature for the query comprises:
determining the at least one previously executed query from a plurality of previously executed queries based, at least in part, on the another edge digital signature.

6. The computer-implemented method of claim 1, wherein a similarity function is utilized to generate the node digital signature from a plurality of hashed representations of the nodes for the query.

7. The computer-implemented method of claim 1, wherein an aggregation is utilized to generate the edge digital signature from a plurality of bitmaps of the edges for the query.

8. A system comprising:
a memory having computer readable instructions; and
one or more processors for executing the computer readable instructions, the computer readable instructions controlling the one or more processors to perform operations comprising:
generating a node digital signature for nodes in a query;
generating an edge digital signature for edges in the query, the edges connecting the nodes;
selecting at least one previously executed query based on the node digital signature and the edge digital signature for the query; and
causing the query to be processed according to an assignment associated with the at least one previously executed query, wherein the at least one previously executed query has another node digital signature and another edge digital signature, the selecting further comprising determining that the assignment of the at least one previously executed query is to be utilized for processing the query based, at least in part, on the another node digital signature.

9. The system of claim 8, wherein the node digital signature comprises properties of the nodes in a directed acyclic graph, the directed acyclic graph being a representation of the nodes and the edges in the query.

10. The system of claim 8, wherein the edge digital signature comprises properties associated with the edges and a topological ordering of the nodes in a directed acyclic graph, the directed acyclic graph being a representation of the nodes and the edges in the query.

11. The system of claim 8, wherein
selecting the at least one previously executed query based on the node digital signature and the edge digital signature for the query is based, at least in part, on the another node digital signature.

12. The system of claim 8, wherein
selecting the at least one previously executed query based on the node digital signature and the edge digital signature for the query comprises:
determining the at least one previously executed query from a plurality of previously executed queries based, at least in part, on the another edge digital signature.

13. The system of claim 8, wherein a similarity function is utilized to generate the node digital signature from a plurality of hashed representations of the nodes for the query.

14. The system of claim 8, wherein an aggregation is utilized to generate the edge digital signature from a plurality of bitmaps of the edges for the query.

15. A computer program product comprising a computer readable storage medium having program instructions embodied therewith, the program instructions executable by one or more processors to cause the one or more processors to perform operations comprising:
generating a node digital signature for nodes in a query;
generating an edge digital signature for edges in the query, the edges connecting the nodes;
selecting at least one previously executed query based on the node digital signature and the edge digital signature for the query; and
causing the query to be processed according to an assignment associated with the at least one previously executed query, wherein the at least one previously executed query has another node digital signature and another edge digital signature, the selecting further comprising determining that the assignment of the at least one previously executed query is to be utilized for processing the query based, at least in part, on the another node digital signature.

16. The computer program product of claim 15, wherein the node digital signature comprises properties of the nodes in a directed acyclic graph, the directed acyclic graph being a representation of the nodes and the edges in the query.

17. The computer program product of claim 15, wherein the edge digital signature comprises properties associated with the edges and a topological ordering of the nodes in a directed acyclic graph, the directed acyclic graph being a representation of the nodes and the edges in the query.

18. The computer program product of claim 15, wherein
selecting the at least one previously executed query based on the node digital signature and the edge digital signature for the query is based, at least in part, on the another node digital signature.

19. The computer program product of claim 15, wherein
selecting the at least one previously executed query based on the node digital signature and the edge digital signature for the query comprises:

determining the at least one previously executed query from a plurality of previously executed queries based, at least in part, on the another edge digital signature.

20. The computer program product of claim 15, wherein a similarity function is utilized to generate the node digital signature from a plurality of hashed representations of the nodes for the query.

* * * * *